United States Patent
Peng et al.

(10) Patent No.: US 11,212,122 B2
(45) Date of Patent: Dec. 28, 2021

(54) POWER SOURCE EQUIPMENT WITH POWERING OVER ETHERNET

(71) Applicant: Delta Electronics, Inc., Taoyuan (TW)

(72) Inventors: Yung-Wei Peng, Taoyuan (TW);
Kuan-Hsien Tu, Taoyuan (TW);
Yen-Lun Wu, Taoyuan (TW);
Cheng-En Liu, Taoyuan (TW);
Hsuan-Chen Lin, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 0 days.

(21) Appl. No.: 16/927,185

(22) Filed: Jul. 13, 2020

(65) Prior Publication Data
US 2021/0126804 A1   Apr. 29, 2021

(30) Foreign Application Priority Data
Oct. 24, 2019   (CN) .......................... 201911017009.2

(51) Int. Cl.
*H04L 12/10*   (2006.01)
*H04L 12/40*   (2006.01)
*G06F 1/26*   (2006.01)

(52) U.S. Cl.
CPC ............. *H04L 12/10* (2013.01); *G06F 1/266* (2013.01); *H04L 12/40045* (2013.01)

(58) Field of Classification Search
CPC . G06F 1/32; G06F 1/266; H04L 12/10; H04L 12/40045
See application file for complete search history.

(56) References Cited

U.S. PATENT DOCUMENTS

| | | | |
|---|---|---|---|
| 6,351,820 B1* | 2/2002 | Oh-Yang | G06F 13/4081 713/323 |
| 8,158,883 B2 | 4/2012 | Soffer | |
| 2009/0136234 A1* | 5/2009 | Mottahedin | H04B 10/40 398/135 |
| 2010/0007220 A1* | 1/2010 | Lo | H04L 12/10 307/151 |
| 2014/0191588 A1* | 7/2014 | Stevens | G06F 1/266 307/125 |
| 2020/0195451 A1* | 6/2020 | Chen | G06F 1/3203 |

FOREIGN PATENT DOCUMENTS

TW   201906368 A   2/2019

* cited by examiner

*Primary Examiner* — Phil K Nguyen
*Assistant Examiner* — Brian J Corcoran
(74) *Attorney, Agent, or Firm* — Muncy, Geissler, Olds and Lowe, P.C.

(57) ABSTRACT

A power source device coupled to a power device includes an output port and a controller. When the output port is coupled to a connection cable, the controller is activated to generate a handshake signal, so as to communicate with the power device. When it is determined that the power device is able to be powered according to the handshake signal, the controller controls the power supply device to power the power device through the connection cable. When the connection cable is not coupled to the output port, the controller is deactivated and thus the handshake signal is not generated.

9 Claims, 6 Drawing Sheets

POWER SOURCE EQUIPMENT WITH POWERING OVER ETHERNET

CROSS REFERENCE TO RELATED APPLICATIONS

This application claims priority of China Patent Application No. 201911017009.2, filed on Oct. 24, 2019, the entirety of which is incorporated by reference herein.

BACKGROUND OF THE INVENTION

Field of the Invention

The disclosure relates generally to a power source device, and more particularly it relates to a power source device that can supply power over an Ethernet.

Description of the Related Art

Most products nowadays determine whether to supply power to a power device via full-time handshake communication between power source equipment and a power device. Therefore, even when a power device is not coupled to power source equipment, the power source equipment still continuously transmits the handshake signal to detect the power device, resulting in power consumption, and the power source equipment with power over Ethernet is unable to meet current energy efficiency regulations, such as the Department of Energy (DoE), EC certificate of conformity (EC CoC).

In order to lower power consumption in no load condition and to meet current energy efficiency regulations, optimization of the power supply equipment and the control method thereof is required.

BRIEF SUMMARY OF THE INVENTION

In an embodiment, a power source device, which is coupled to a power device through a connection cable, includes an output port and a controller. The output port is configured to be coupled to the connection cable. When the connection cable is coupled to the output port, the controller is activated to generate a handshake signal so as to communicate with the power device. When the controller determines that the power device is able to be powered according to the handshake signal, the controller controls the power source device to power the power device through the connection cable. When the connection cable is not coupled to the output port, the controller is deactivated and thus the handshake signal is not generated.

According to an embodiment of the invention, the power source device further includes a trigger unit. When the connection cable is coupled to the output port, the trigger unit is triggered so that the supply voltage is provided to the controller through the trigger unit, thereby activating the controller.

According to an embodiment of the invention, when the connection cable is not coupled to the output port, the trigger unit is not triggered so that the supply voltage is unable to be provided to the controller through the trigger unit, thereby deactivating the controller.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
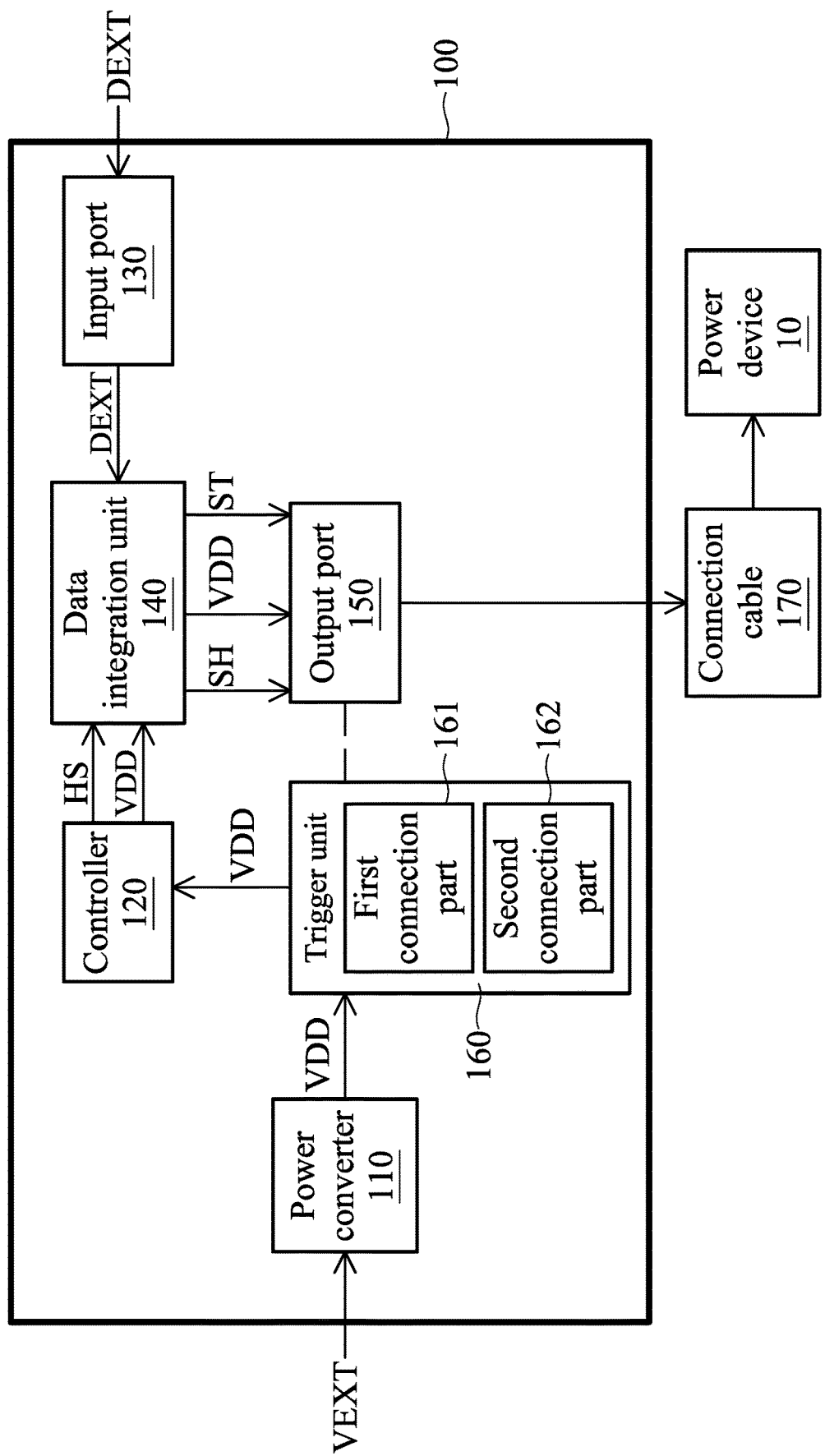
FIG. 1 is a block diagram of a power source device in accordance with an embodiment of the invention.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It should be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

FIG. 1 is a block diagram of a power source device in accordance with an embodiment of the invention. As shown in FIG. 1, the power source device 100 includes a power converter 110, a controller 120, an input port 130, a data integration unit 140, an output port 150, and a trigger unit 160. In the embodiment, when the power device 10 is coupled to the power source device 100 through a connection cable 170 (for example, Ethernet cable), the power source device 100 can not only transmit the data received from the input port 130 to the power device 10 through the connection cable 170, but also supply the power device 10 with a voltage, into which the power converter 110 converts the external voltage VEXT (for example, electric supply), through the connection cable 170.

More specifically, when the power device 10 is coupled to the output port 150 of the power source device 100 through the connection cable 170, the controller 120 generates a handshake signal HS and transmits the handshake signal HS to the power device 10 through the connection cable 170 so as to communicate with the power device 10 to determine whether the power device 10 meets the specific regulations. When it is determined that the power device 10 meets some specific regulations, the controller 120 determines the power/current that the power device 10 requires (for example, determine to provide how much power to the power device 10 through a current signal) during the communication, and allows the power source device 100 to power the power device 10. Since the powering protocol has been established, it is not necessary for the controller 120 to communicate with the power device 10 so as to stop generating the handshake signal HS at the meanwhile. When it is determined that the power device 10 does not meet the specific regulations, the controller 120 prohibits the power source device 100 from powering the power device 10 and periodically transmits the handshake signal HS to confirm it.

On the other hand, when the power device 10 is not coupled to the output port 150 of the power source device 100, in conventional, the controller 120 still periodically generates and transmits the handshake signal HS to confirm whether the power device 10 is coupled to the power source device 100. However, it results in that the controller 120 still consumes power to generate the handshake signal HS for making the confirmation even when the power device is not coupled to the power source device 100.

The conventional method may have issues of power consumption on the power source device 100 when the power device 10 is not coupled to the power source device 100. In the embodiment, when the power device 10 is not coupled to the power source device 100, the controller 120 is not activated and does not generate the handshake signal HS so as to reduce the power consumption of the power source device 100 in no load condition and to meet the power efficiency regulations. The embodiments will be described in the following paragraphs.

According to an embodiment of the invention, the power source device 100 meets the IEEE 802.3at Power over Ethernet (PoE) regulations. According to another embodiment of the invention, the power source device 100 meets the IEEE 802.3af Power over Ethernet (PoE) regulations. According to yet another embodiment of the invention, the power source device 100 meets the IEEE 802.3bt Power over Ethernet (PoE) regulations.

According to an embodiment of the invention, the power converter 110 converts the external voltage VEXT (for example, electric supply) into the supply voltage VDD. According to some embodiments of the invention, the power converter 110 can be an AC-DC converter converting AC voltage of electricity supply into a DC voltage, and the DC voltage can be applied to elements in the power source device 100 (for example, the controller 120) and/or devices other than the power source device 100 (for example, the power device 10).

The controller 120 is supplied by the supply voltage VDD through the trigger unit 160 (it will be described in detail in the following paragraphs) and generates the handshake signal HS. According to an embodiment of the invention, when the controller 120 confirms, that the power device 10 is able to be powered (i.e., the power device 10 meets the power over Ethernet regulations) according to the handshake signal HS, the controller 120 stops transmitting the handshake signal HS. In addition, the controller 120 can acquire the loading condition of the power device 10 during the communication with the power device 10 so as to control the power converter 110 to convert the external voltage VEXT to provide the voltage/current that the power device 10 needs. The converted voltage/current is supplied to the power device 10 through the data integration unit 140, the output port 150, and the connection cable 170.

According to another embodiment of the invention, when the controller 120 confirms, via the handshake signal HS, that the power device 10 is not able to be powered (i.e., the power device 10 does not meet the power over Ethernet regulations), the controller 120 controls the power source device 100 not to power the power device 10 and continuously and periodically transmits the handshake signal HS to confirm the power device 10.

The input port 130 receives the external data DEXT and transmits the external data DEXT to the data integration unit 140. When the controller 120 confirms, via the handshake signal HS, that the power device 10 is able to be powered, the data integration unit 140 can transmits the external data DEXT to the power device 10 through the output port 150 and the connection cable 170.

The output port 150 is coupled to the connection cable 170, in which the connection cable 170 has a connector configured to be coupled to the output port 150 (not shown in FIG. 1). According to an embodiment of the invention, the output port 150 is a socket of RJ-45, and the connection cable 170 is a network cable having an RJ-45 connector. When the output port 150 is coupled to the connection cable 170, it indicates that the RJ-45 connector of the network cable is placed within the output port 150.

In the embodiment, the power source device 100 further includes a trigger unit 160 which is triggered when the connection cable 170 is coupled to the output port 150. According to an embodiment of the invention, when the trigger unit 160 is triggered, the supply voltage VDD from the power converter 110 can be directly supplied to the controller 120 through the trigger unit 160 so as to power and to activate the controller 120. Therefore, the controller 120 transmits the handshake signal HS to communicate with the power device 10. According to another embodiment of the invention, when the trigger unit 160 is not triggered, the supply voltage VDD is not supplied to the controller 120 so that the controller 120 does not transmit the handshake signal HS, so as to reduce the power consumption of the power source device 100 and further to meet the energy efficiency regulations. According to an embodiment of invention, in order to more accurately detect whether the connector of the connection cable 170 is plugged in to the output port 150, the trigger unit 160 is disposed in the output port 150.

According to an embodiment of the invention, the trigger unit 160 includes a first connection part 161 and a second connection part 162, in which the first connection part 161 and the second connection part 162 are electrically isolated (i.e., the trigger unit 160 is not triggered) when no force is supplied to the first connection part 161. When the force is supplied to the first connection part 161, the first connection part 161 can be moved into contact with the second connection part 162 to form an electrical connection, i.e., the first connection unit 160 is triggered. More specifically, when the connection cable 170 is not coupled to the output port 150, the first connection part 161 maintains the status without any supplied force and is electrically isolated from the second connection part 162 so that the supply voltage VDD is unable to be supplied to the controller 120 through the trigger unit 160, thereby deactivating the controller 120. When the connection cable 170 is coupled to the output port 150, the first connection part 161 is connected against a terminal of the connection cable 170, such as the connector, and is pushed by it, so that the first connection part 161 eventually moves into contact with the second connection part 162 to form an electrical connection. Therefore, the supply voltage VDD is able to be supplied to the controller 120 through the trigger unit 160, thereby activating the controller 120. The embodiments of the trigger unit 160 will be fully described in the following paragraphs.

Figure 2:
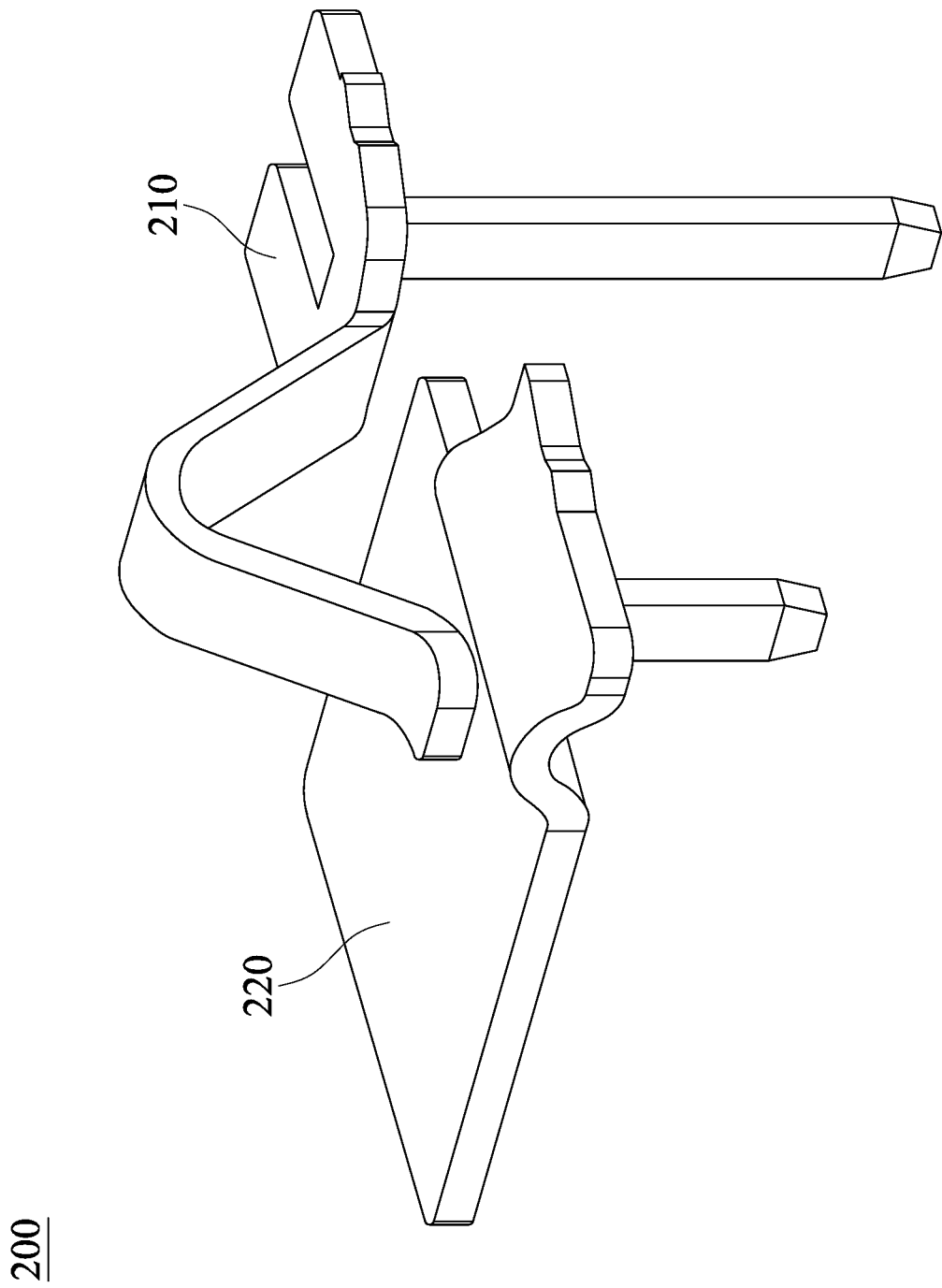
FIG. 2 is a schematic diagram of a trigger unit in accordance with an embodiment of the invention.

FIG. 2 is a schematic diagram of a trigger unit in accordance with an embodiment of the invention. As shown in FIG. 2, the trigger unit 200 includes a spring sheet 210 (i.e., the first connection part 161 in FIG. 1) and a metal contact 220 (i.e., the second connection part 162 in FIG. 1), in which the spring sheet 210 is coupled to a node (for example, the output terminal of the power converter 110) to receive the supply voltage VDD, and the metal contact 220 is coupled to the controller 120 in FIG. 1. According to an embodiment of the invention, the trigger unit 220 corresponds to the trigger unit 160 in FIG. 1.

Figure 3:
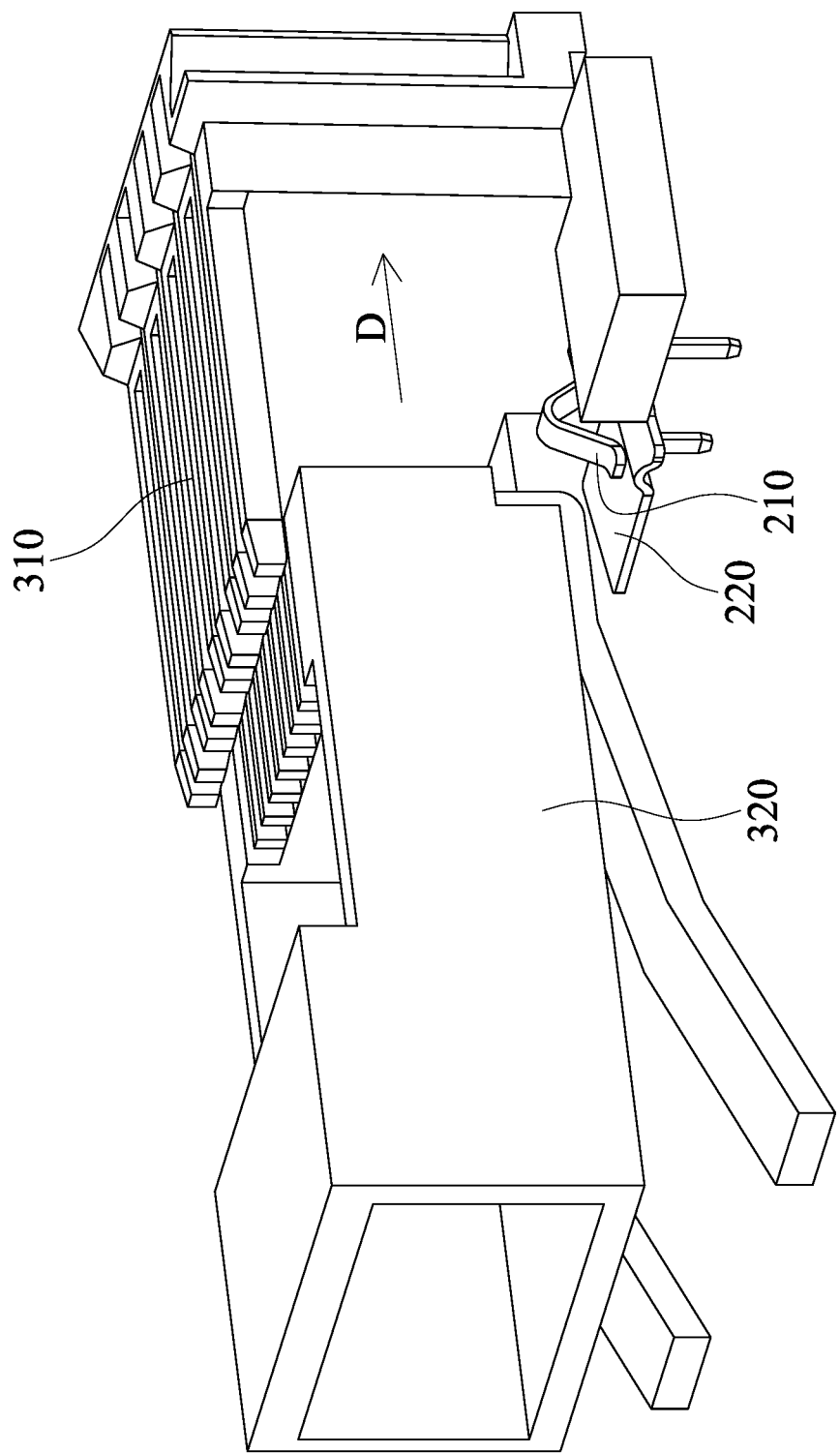
FIG. 3 is a schematic diagram of an output port in accordance with an embodiment of the invention.

FIG. 3 is a schematic diagram of an output port in accordance with an embodiment of the invention. As shown in FIG. 3, the output port 310 is configured to accommodate the connector 320 of the connection cable. According to an embodiment of the invention, the connection cable is configured to couple the power source device 100 in FIG. 1 to the power device 10, and the output port 310 corresponds to the output port 150 in FIG. 1. According to an embodiment of the invention, the trigger unit 200 is disposed in the output port 310.

According to an embodiment of the invention, when the connector 320 is plugged in to the output port 310 (i.e., the connector 320 is plugged in to the output port 310 along the insert direction D), the connector 320 is connected against the spring sheet 210 to move (for example, to press), so that the spring sheet 210 directly contact the metal contact 220 (i.e., the spring sheet 210 is electrically coupled to the metal contact 220). In the embodiment, the spring sheet 210 being electrically coupled to the metal contact 220 indicates that the trigger unit 200 has been triggered. In other words, when the connector 320 is plugged in to the output port 310, the spring sheet 210 is electrically coupled to the metal contact 220 and the supply voltage VDD is supplied to the controller 120 through the spring sheet 210 and the metal contact 220 so that the controller 120 is activated and transmits the handshake signal HS to communicate with the power device 10 through the connection cable 170 for determining whether to power the power device 10.

According to another embodiment of the invention, when the connector 320 is not plugged in to the output port 310, the spring sheet 210 is isolated from the metal contact 220. In the embodiment, the spring sheet 210 being isolated from (or not electrically coupled to) the metal contact 220 indicates that the trigger unit 200 is not being triggered. Therefore, the controller 120 is unable to receive the supply voltage so that it does not transmit the handshake signal HS to communicate with power device 10, thereby reducing the power consumption of the power source device 100 in no load condition (i.e., not coupled to the power device 10).

It should be noted that the trigger unit of the embodiment only includes mechanical structures, such as a spring sheet and a metal contact, without other circuit elements, so that the triggering of the trigger unit is performed by a physical operation. In other words, in some embodiments of the invention, the determination as to whether the connection cable is coupled to the output port (i.e., whether the connector is plugged in to the output port) is not made by electrical detection. For example, elements of the power source device are used to transmit the signal, such as a current, and the determination as to whether the connection cable is coupled to the output port is made based on a corresponding feedback signal, such as another current, being received or not. Instead, the trigger unit in the embodiment physically detects whether the connector is fully plugged in to the output port (i.e., the connector is coupled to the output port) by moving the spring sheet in conjunction with the connector to be in contact with the metal contact while the connector is being plugged in. The advantage of this method is that the determination can be fast and accurate, and the cost of the trigger unit is low.

However, the invention is not intended to be limited thereto. In other embodiments, other detection unit can be utilized to determine whether the connection cable is coupled to the output port, and the description is in the following paragraphs.

Figure 4:
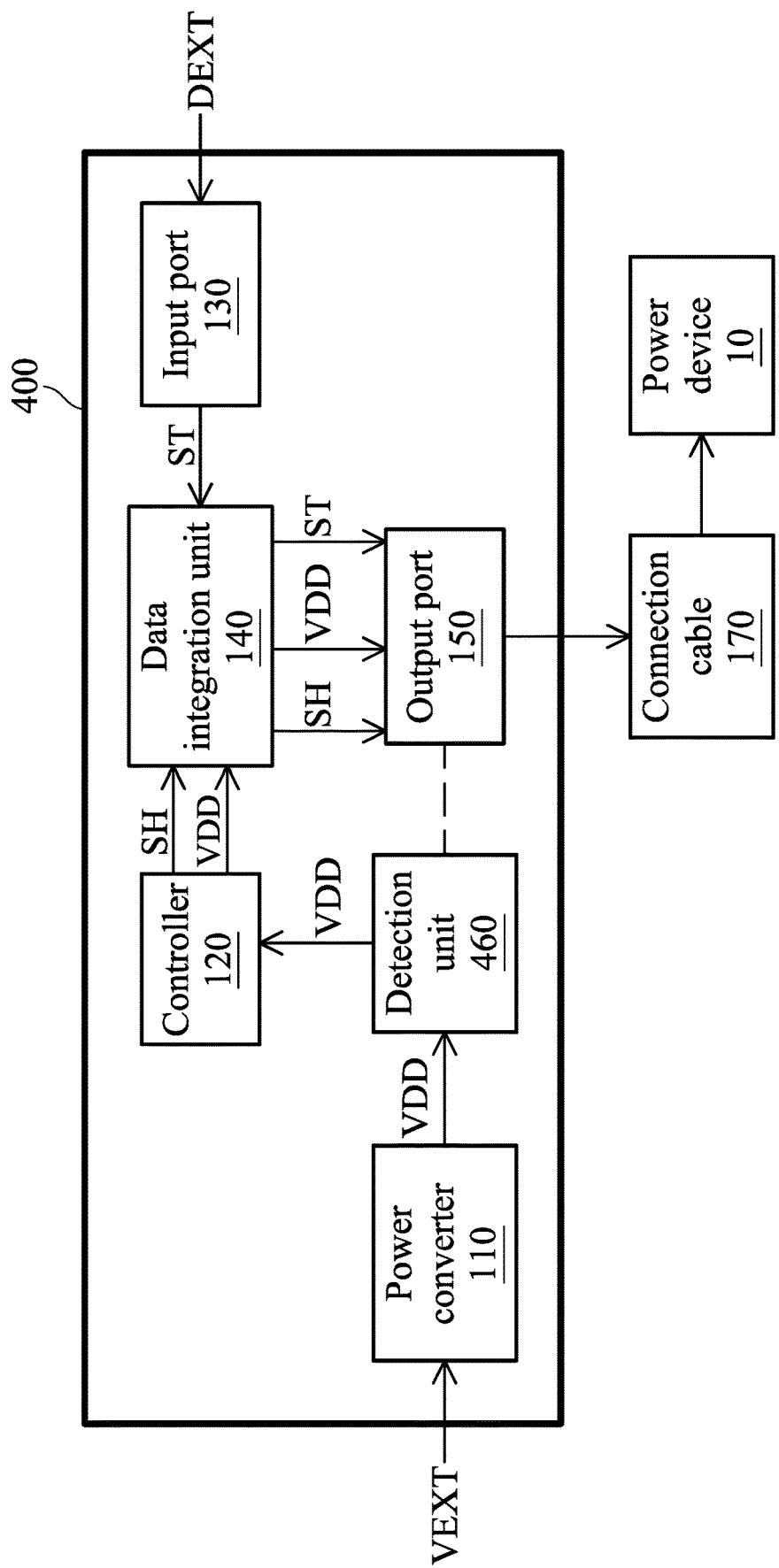
FIG. 4 is a block diagram of a power source device in accordance with another embodiment of the invention.

FIG. 4 is a block diagram of a power source device in accordance with another embodiment of the invention. Compared the power source device 400 with the power source device 100 in FIG. 1, the trigger unit 160 in FIG. 1 is replaced with the detection unit 460 in FIG. 4, and other elements are still the same.

The detection unit 460 is configured to determine whether the connection cable 170 is coupled to the output port 150 so as to supply the supply voltage VDD to the controller 120 to generate the handshake signal HS. According to an embodiment of the invention, when the detection unit 460 determines that the connection cable 170 is coupled to the output port 150, the detection unit 460 supplies the supply voltage VDD to the controller 120, and the controller 120 transmits the handshake signal HS to communicate with the power device 10. According to an embodiment of the invention, in order to accurately detect whether the connector of the connection cable 170 is plugged in to the output port 150, the detection unit 460 is placed within the output port 150.

According to another embodiment of the invention, when the detection unit 460 determines that the connection cable 170 is not coupled to the output port 150, the detection unit 460 does not supply the supply voltage VDD to the controller 120 so that the controller 120 is disable. Therefore, the power consumption of the power source device 400 is reduced so as to meet the energy efficiency regulations.

Figure 5:
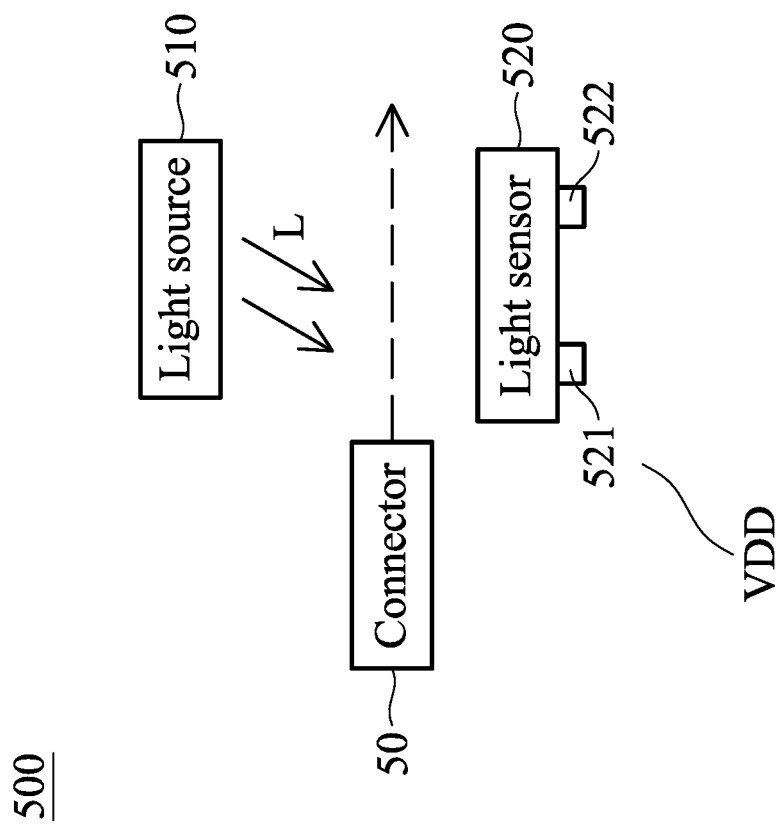
FIG. 5 is a block diagram of a detection unit in accordance with another embodiment of the invention.

FIG. 5 is a block diagram of a detection unit in accordance with another embodiment of the invention. As shown in FIG. 5, the detection unit 500 includes a light source 510 and a light sensor 520. According to an embodiment of the invention, the detection unit 500 is placed within the output port 150 in FIG. 4.

The light source 510 is configured to generate light beam L, and the light sensor 520 is configured to detect the light beam L. the light sensor 520 further includes a first light node 521 and a second light node 522. The first light node 521 is coupled to the node supplying the supply voltage VDD, and the second light node 522 is coupled to the controller 120 in FIG. 4. When the light sensor 520 detects the light beam L, the light sensor 520 isolate the first light node 521 from the second light node 522. When the light sensor 520 fails to detect the light beam L, the light sensor 520 electrically couples the first light node 521 to the second light node 522.

According to an embodiment of the invention, when the connector 50 of the connection cable 170 is plugged in to the output port 150 to be located between the light source 510 and the light sensor 520, the connector 50 blocks the light beam L generated by the light source 510 so that the light sensor 520 is unable to detect the light beam L and electrically couples the first light node 521 to the second light node 522. That is, the light sensor 520 supplies the supply voltage VDD to the controller 120 so that the controller 120 transmits the handshake signal HS to communicate with the power device 10.

According to another embodiment of the invention, when the connector 50 is not plugged in to the connector 310, the light sensor 520 detects the light beam L to isolate the first light node 521 from the second light node 522. That is, the light sensor 520 does not supply the supply voltage VDD to the controller 120 so that the controller 120 does not generate the handshake signal HS, thereby reducing the power consumption of the power source device 400 in no load condition.

Figure 6:
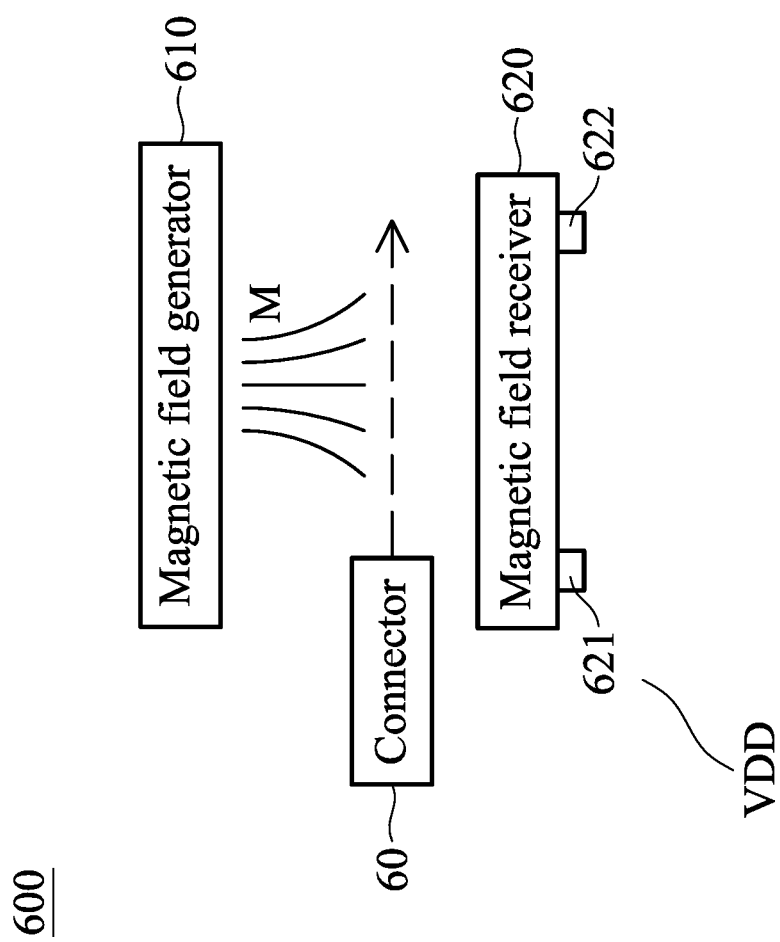
FIG. 6 is a block diagram of a detection unit in accordance with another embodiment of the invention.

FIG. 6 is a block diagram of a detection unit in accordance with another embodiment of the invention. As shown in FIG. 6, the detection unit 600 includes a magnetic field generator 610 and a magnetic field receiver 620. According to an embodiment of the invention, the detection unit 600 is placed within the output port 150 in FIG. 4.

The magnetic field generator 610 is configured to generate a magnetic field M, and the magnetic field receiver 620 is configured to receive the magnetic field M. the magnetic field receiver 620 further includes a first magnetic field node 621 and a second magnetic field node 622. The first magnetic field node 621 is coupled to the node supplying the supply voltage VDD, and the second magnetic field node 622 is coupled to the controller 120 in FIG. 4. When the magnetic field receiver 620 detects the magnetic field M, the magnetic field receiver 620 isolates the first magnetic field node 621 from the second magnetic field node 622. When the magnetic field receiver 620 is unable to detect the magnetic field M, the magnetic field receiver 620 electrically couples the first magnetic field node 621 to the second magnetic field node 622.

According to an embodiment of the invention, when the connector 60 of the connection cable 170 is plugged in to the output port 150 to be located between the magnetic field generator 610 and the magnetic field receiver 620, the connector 60 blocks the magnetic field M generated by the magnetic field generator 610 so that the magnetic field receiver 620 is unable to receive the magnetic field M, and electrically couples the first magnetic field node 621 to the second magnetic field node 622. That is, the magnetic field generator 620 supplies the supply voltage VDD to the controller 120 so that the controller 120 transmits the handshake signal HS to communicate with the power device 10.

According to another embodiment of the invention, when the connector 60 is not plugged in to the output port 150, the magnetic field receiver 620 detects the magnetic field M to isolate the first magnetic field node 621 from the second magnetic field node 622. That is, the magnetic field receiver 620 does not supply the supply voltage VDD to the controller 120 so that the controller 120 does not generate the handshake signal HS to reduce the power consumption of the power source device 400 in no load condition.

The power consumption of the power source device can be effectively reduced by determining whether the connector of the connection cable is plugged in to the output port to enable the controller to generate the handshake signal to communicate with the power device, thereby meeting the increasingly stringent energy efficiency regulations. In addition, the implementation method of the invention for determining whether the connector of the connection cable is plugged in to the output port is a physical operation. In other words, whether the connection cable is coupled to the output port (i.e., whether the connector is plugged in to the output port) is not determined by electrical detection, but by physical detection. Namely, when the connector is plugged into the output port, the spring sheet is moved in conjunction with the connector to be in contact with the metal contact so that it is determined that the connector is fully plugged into the output port (i.e., the connection cable is coupled to the output port). The advantage of this manner is that the determination is made fast and accurately, and the cost of the trigger unit is low.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A power source device coupled to a power device through a connection cable, comprising:

an output port configured to be coupled to the connection cable;

a controller, wherein when the connection cable is coupled to the output port, the controller is activated to generate a handshake signal so as to communicate with the power device, wherein when the controller determines that the power device is able to be powered according to the handshake signal, the controller controls the power source device to power the power device through the connection cable; when the connection cable is not coupled to the output port, the controller is deactivated, and thus the handshake signal is not generated;

a power converter, configured to convert an external voltage into a supply voltage, wherein the controller is activated by the supply voltage; and a trigger unit, wherein when the connection cable is coupled to the output port, the trigger unit is triggered so that the supply voltage is provided to the controller through the trigger unit, thereby activating the controller, wherein the trigger unit comprises:

a spring sheet coupled to a node which provides the supply voltage; and a metal contact coupled to the controller;

wherein when the connection cable is not coupled to the output port, the spring sheet is electrically isolated from the metal contact.

2. The power source device of claim 1, wherein the power converter is configured to convert the external voltage into a voltage/current required by the power device when the power device is determined to be able to be powered.

3. The power source device of claim 2, further comprising:
an input port configured to receive external data; and
a data integration unit configured to provide the external data and the voltage/current required by the power device through the output port and the connection cable.

4. The power source device of claim 2, further comprising:
a detection unit configured to determine whether the connection cable is coupled to the output port, wherein when the connection cable is coupled to the output port, the detection unit provides the supply voltage to the controller to activate the controller; when the connection cable is not coupled to the output port, the detection unit does not provide the supply voltage to the controller so as to deactivate the controller.

5. The power source device of claim 4, wherein the detection unit comprises:
a light source configured to generate a light beam; and
a light sensor configured to detect the light beam, wherein when the connection cable is coupled to the output port, the light sensor is unable to detect the light beam so that the detection unit provides the supply voltage to the controller.

6. The power source device of claim 4, wherein the detection unit comprises:
a magnetic field generator configured to generate a magnetic field; and
a magnetic field receiver configured to receive the magnetic field, wherein when the connection cable is coupled to the output port, the magnetic field receiver is unable to receive the magnetic field, and as a result, the detection unit provides the supply voltage to the controller.

7. The power source device of claim 1, wherein when the connection cable is not coupled to the output port, the trigger unit is not triggered so that the supply voltage is unable to be provided to the controller through the trigger unit, thereby deactivating the controller.

8. The power source device of claim 1, wherein the trigger unit comprises a first connection part and a second connection part, wherein on the condition that no force is applied to the first connection part, the first connection part is electrically isolated from the second part, and on the condition that the force is applied to the first connection part, the first connection part is moved into contact with the second connection part to form an electrical connection.

9. The power source device of claim 1,
wherein when the connection cable is coupled to the output port, one terminal of the connection cable is connected against the spring sheet such that the spring sheet is moved into contact with the metal contact, thereby forming the electrical connection between the metal sheet and the metal contact.

* * * * *